United States Patent
Heib et al.

(10) Patent No.: US 6,281,653 B1
(45) Date of Patent: *Aug. 28, 2001

(54) METHOD OF DETECTING AFTER-RUNNING OF ELECTRICAL SERVOMOTORS PROVIDED WITH MEANS FOR INCREMENTAL POSITION DETECTION

(75) Inventors: Johannes Heib, Buchlertal; Patric Kahles, Baden-Baden, both of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,563
(22) PCT Filed: Jan. 13, 1998
(86) PCT No.: PCT/DE98/00098
  § 371 Date: Jul. 28, 1999
  § 102(e) Date: Jul. 28, 1999
(87) PCT Pub. No.: WO98/33101
  PCT Pub. Date: Jul. 30, 1998

(30) Foreign Application Priority Data

Jan. 28, 1997 (DE) .............................................. 197 02 931

(51) Int. Cl.$^7$ ................................................... G05B 19/29
(52) U.S. Cl. ..................... 318/600; 318/569; 318/443; 318/560; 318/603; 318/572
(58) Field of Search ..................... 318/600, 569, 318/443, 560, 603, 572

(56) References Cited

U.S. PATENT DOCUMENTS

| 5,130,710 | * | 7/1992 | Salazar .................................... 341/11 |
| 5,763,874 |   | 6/1998 | Luciano et al. . |
| 5,956,659 | * | 9/1999 | Spies et al. ........................... 318/600 |
| 6,111,384 |   | 8/2000 | Stagnitto .............................. 318/602 |
| 6,121,745 |   | 9/2000 | Komm ................................. 318/254 |

FOREIGN PATENT DOCUMENTS

| 196 06 471 A1 | 9/1996 | (DE) . |
| 0 365 736 B1 | 5/1994 | (EP) . |
| 0 615 111 A1 | 9/1994 | (EP) . |

OTHER PUBLICATIONS

Article "Busfaehinger Intelligenter Sensor Fuer Winkel Und Wege" By W. Kuntz and H. Walcher, In Technisches Messen Tm. 53 Jahrgang. Heft 6 1986.

* cited by examiner

*Primary Examiner*—Karen Masih
(74) *Attorney, Agent, or Firm*—Michael J. Striker

(57) ABSTRACT

The method for detecting after-running of electrical servomotors with incremental position detection, particularly for servomotors in motor vehicles, includes detecting position signals of position indicators and storing the detected states of the position signals or the states of the position indicators after switching off the motor in a nonvolatile memory. The evaluation electronics can be intermittently disconnected from the supply voltage. They are provided with a buffer that is large enough for position detection and storage after disconnection of the evaluation electronics from the supply voltage. The nonvolatile memory can be an EEPROM in the microcontroller of the evaluation electronics.

11 Claims, 3 Drawing Sheets

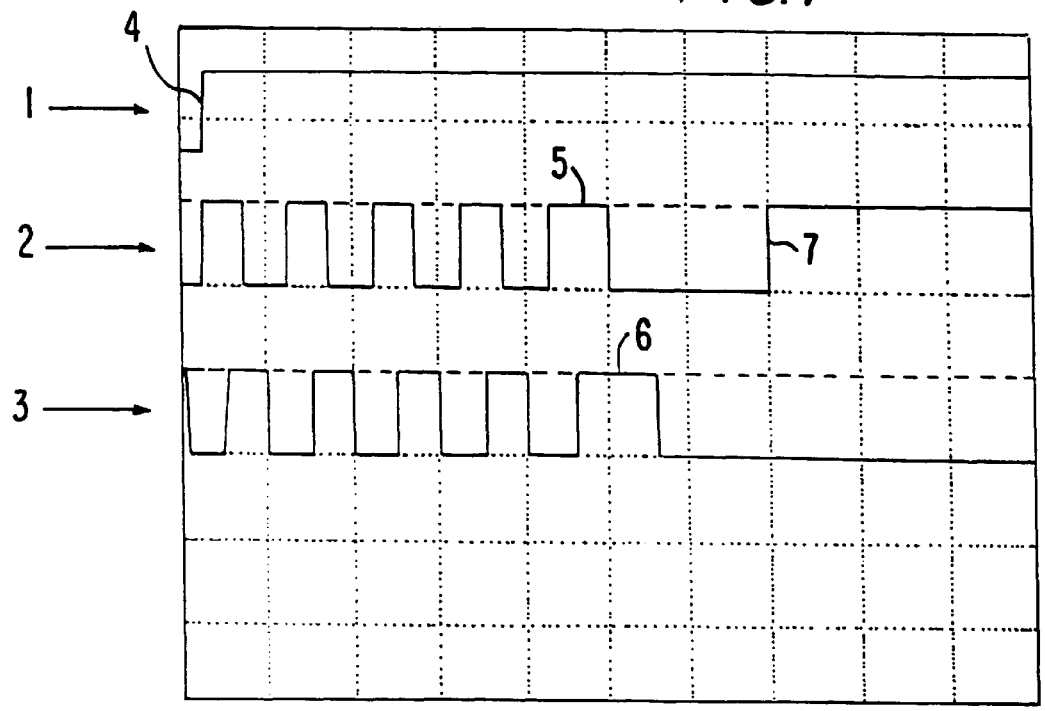

METHOD OF DETECTING AFTER-RUNNING OF ELECTRICAL SERVOMOTORS PROVIDED WITH MEANS FOR INCREMENTAL POSITION DETECTION

BACKGROUND OF THE INVENTION

1. Field of the Invention

The present invention concerns a method of detecting after-running of electrical servomotors, especially electrical servomotors in motor vehicles, with incremental position detection.

2. Prior Art

Methods for detecting after-running of electrical servomotors are known in which evaluation electronics are used to detect position signals of the position indicators and store the states of the incremental position indicators in nonvolatile memory.

A process for position detection of a motor vehicle part driven in two directions by electric motors is known from EP 0 603 506 A2. With the aid of a counter, when the part moves in its two directions, counting pulses of a position indicator are input into the counter in order to reduce or increase the count in accordance with the predetermined movement. After the drive motor is switched off, the pulses supplied from the position indicator are analyzed in their chronological distance from the shutoff time and are associated with a further movement of the counter if the chronological distance of the pulses does not exceed a predetermined measure. When the drive motor is subjected to a polarity reversal the counting direction is associated with the new movement direction only when the distance of the pulses reduces further after the polarity reversal.

In this known process, nothing is disclosed regarding measures that permit a tracking or after-running detection with prior disconnection from the supply voltage and a storage of position data for the subsequent position correction with reconnection to the supply voltage as well as a reduction in the time required for the after-running detection.

SUMMARY OF THE INVENTION

It is an object of the present invention to provide an improved method of detecting after-running of electrical servomotors with incremental position detection, which avoids the disadvantages mentioned above.

This object, and others which will be made more apparent hereinafter, are attained in a method for detecting after-running of electrical servomotors with incremental position detection of the above-described type in which evaluation electronics detect position signals from the position indicators and store the states of the incremental position indicators, which are detected in conjunction with the position signals, in a non-volatile memory.

The method according to the invention comprises intermittently disconnecting the evaluation electronics with a supply voltage to intermittently switch the evaluation electronics off and correcting the status of the incremental position indicators according to a comparison of the stored states of the incremental position indicators with the states of the incremental position indicators after the evaluation electronics are switched on again after being switched off.

The after-running detection according to the invention has the advantage over the prior art that all important data regarding the system status are stored in a nonvolatile memory and can consequently be used as a basis with the next system startup.

According to the invention, in the tracking detection of electrical servomotors with incremental position detection, evaluation electronics are provided in principle for the tracking detection, which electronics detect the position signals of position indicators and wherein the evaluation electronics store the detected states of the position signals and the states of the position indicators in a nonvolatile memory.

Advantageous improvements and updates of the tracking detection of electric servomotors according to the invention, as described above are possible by means of the measures given in the remaining claims.

According to a particularly advantageous embodiment of the device according to the invention, the evaluation electronics can be intermittently disconnected from the supply voltage and are provided with a buffer, which is large enough for the position detection and storage after the evaluation electronics are disconnected from the supply voltage. By means of this particular embodiment, the evaluation electronics are switched on in an energy-saving manner only if they need to be used. Since all important system data have been stored before or around the time of the shutoff, they are available again after the new system startup and form the basis for the continued functioning.

According to a particularly advantageous embodiment of the invention, the storage can already be carried out at a time at which the last possible position signal has not yet been input.

In a further suitable embodiment of the device according to the invention, with the subsequent use of at least two position signals that are offset from each other, i.e. with a reconnection of the evaluation electronics to the supply voltage, a definite rotation direction allocation can be carried out by subsequent correction and allocation of the last edge change of one of the position indicators by means of the evaluation electronics. The last edge change by one of the two position indicators can thus always be definitely allocated.

According to a particularly advantageous additional embodiment of the after-running detection according to the invention, after a reconnection of the evaluation electronics to the supply voltage, if the stored values of the position indicators jointly indicate a state change, the evaluation electronics take the previous rotation direction into consideration in a correction.

The after-running detection according to the invention is used in a particularly advantageous manner in motor vehicles to detect the position when an electric motor, which is used for positioning purposes, is switched off. This can be the case, for example, with window lifters, sunroofs, and seats.

In an additional advantageous embodiment of the invention, Hall sensors that are electrically offset by 90° are provided as position indicators.

According to a particularly suitable embodiment of the after-running detection according to the invention, the evaluation electronics include a micro-controller.

According to another advantageous improvement of the invention, an electronically programmable memory is used as the nonvolatile memory. According to a suitable embodiment, an EEPROM is used as the nonvolatile memory, which is preferably a component of the micro-controller.

BRIEF DESCRIPTION OF THE DRAWING

The invention will be explained in detail in the description below in conjunction with a number of exemplary embodiments depicted in the drawings.

FIG. 1 schematically depicts a graphical illustration of the motor signal and two position signals of an adjusting drive, which are electrically offset from each other by 90°, and FIG. 2 shows a table with the old state of the two incremental indicators when storing and with the new state of the incremental indicators after the renewed switching on of the evaluation electronics.

DESCRIPTION OF THE EXEMPLARY EMBODIMENTS

Figure 3:
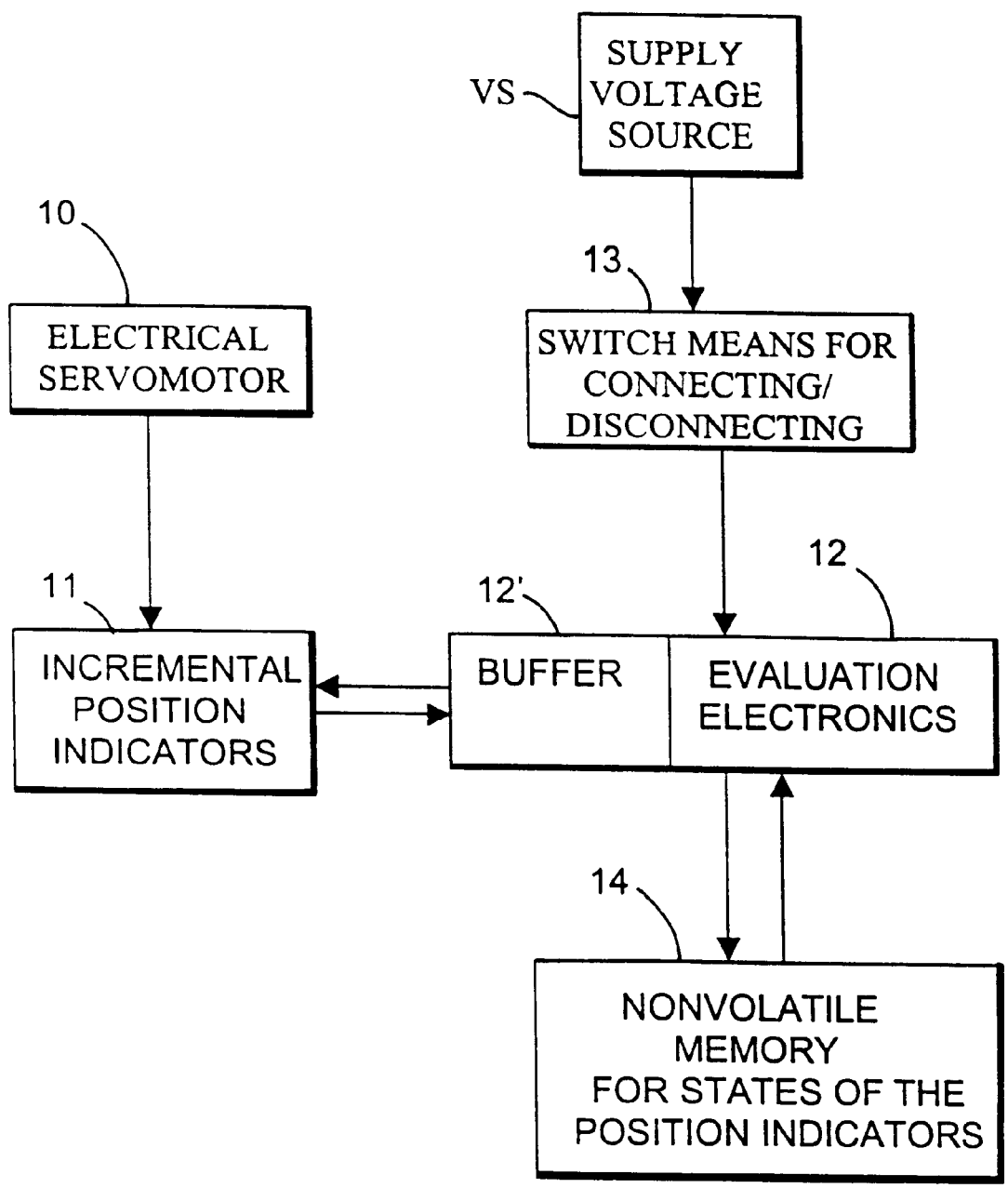
FIG. 3 is a block diagram of an apparatus for performing the method according to the invention.
Figure 4:
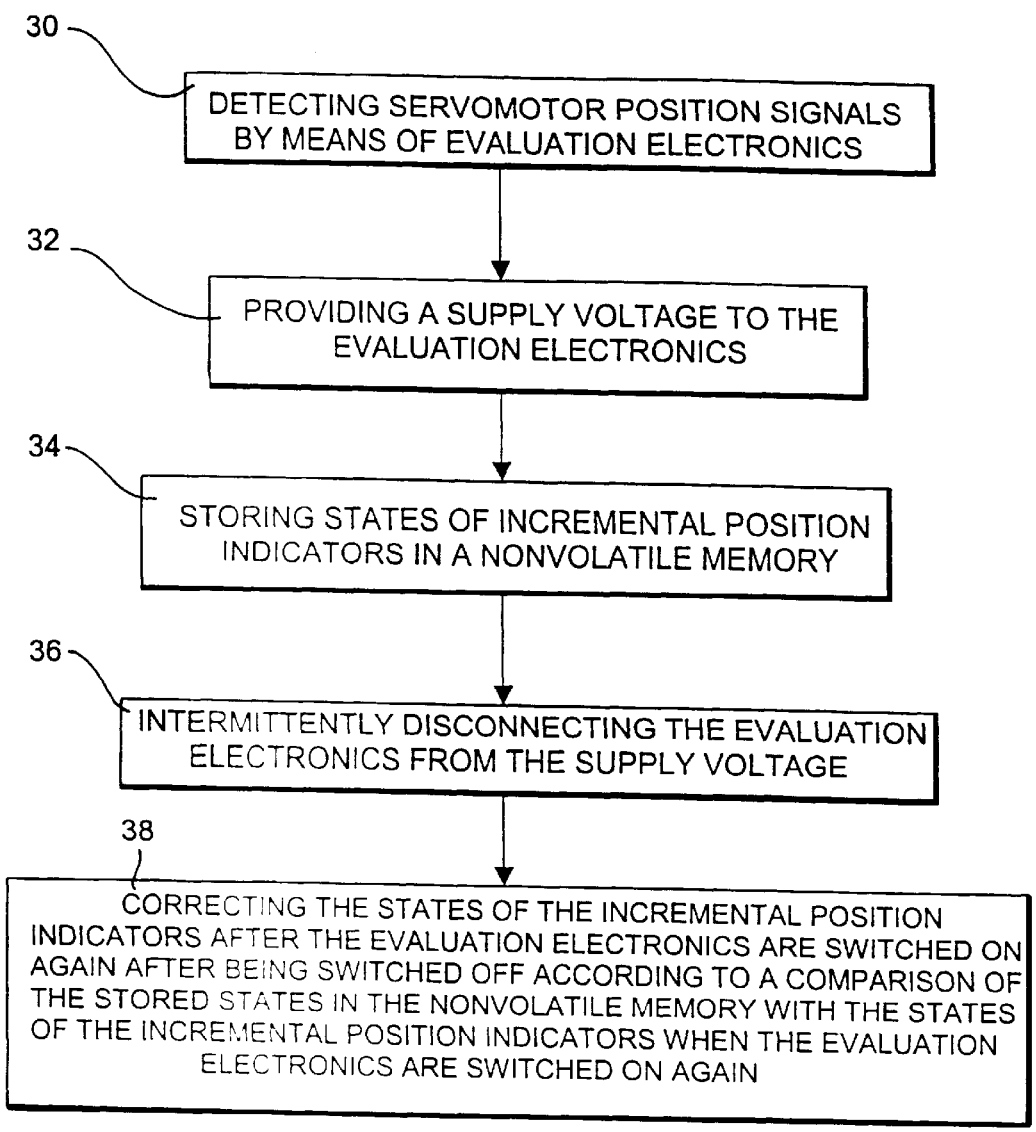
FIG. 4 is a flow chart of the method according to the invention.

A flow chart of the method according to the invention is shown is FIG. 4 and an apparatus for performing the method is shown in FIG. 3.

According to one exemplary embodiment of the current invention as shown in connection with FIGS. 3 and 4, in a tracking detection of electrical servomotors with incremental position detection, the position of the servomotor 10 when the motor is switched off is detected by the evaluation electronics 12 provided in step 30 (FIG. 4). Due to the inertia of the masses of the entire system, the motor 10 usually continues to run until it comes to a final halt. This coasting is detected in order to determine the exact position of the motor and of the adjusting system driven by it. To that end, the evaluation electronics 12 detects the position signals supplied by the position indicators 11 also and particularly during the coasting phase in step 30. The detected states of the position signals or the states of the position indicators are stored in step 34 in a nonvolatile memory 14. Thus the requirement that the evaluation electronics 12 can be intermittently disconnected (by switch means 13) from the supply voltage VS as in step 36 has been met once all of the system data are stored in this nonvolatile memory 14. For the tracking detection, the evaluation electronics are provided with a buffer 12' so that even after the motor is disconnected from the supply voltage VS (which was provided in step 32) for the time of the coasting, the evaluation electronics 12 are still in a position to carry out both the position detection during the coasting and the provided storage of data.

So that the evaluation electronics 12 can be intermittently disconnected from the supply voltage, the evaluation electronics 12 are provided with a buffer 12' that is large enough to be able to carry out both the position detection and the storage of the system data after the motor and the evaluation electronics are disconnected in step 36 from the supply voltage VS.

According to a particular exemplary embodiment of the invention, the storage is already carried out at a time at which the last possible position signal has not yet been input. As a result, the disconnection of the evaluation electronics from the supply voltage can already take place at a favorably early time and consequently a considerable amount of energy can be saved.

FIG. 1 shows the exemplary instance in which the motor signal shown in row 1 changes its digital state with edge 4 when the servomotor, which is not shown in detail, is switched off. With the use of at least two position signals, which are offset in relation to each other, which are shown as electrically offset by 90° in rows 2 and 3 in FIG. 1, the individual position signals become increasingly longer over time and the times between the edge changes increase. This can be seen particularly clearly in the pulses that are labeled 5 and 6. The position signals can be supplied, for example, by Hall sensors.

In order to detect the exact position when the motor is switched off, one must wait until the last edge change before the position data can be stored in the nonvolatile memory. According to a particular embodiment of the invention, this time can be shortened. To this end, the states of the incremental position indicators are likewise stored in the nonvolatile memory. This has the advantage that the last edge change which took place after the storing procedure, can then be subsequently corrected when the system is switched on next. As a result, the time for tracking consideration can also be shortened. Likewise, the necessary buffer capacity can also be reduced by means of this. As a result, subsequently, that is with the reconnection of the evaluation electronics to the supply voltage, a definite rotation direction allocation can be carried out by means of the subsequent correction and allocation of the last edge change of one of the position indicators by means of the evaluation electronics.

Through the use of two incremental position indicators that are electrically offset by 90°, it is possible to carry out a definite rotation allocation. As a result, the last edge change of one of the two position indicators can also be definitely allocated and subsequently corrected.

FIG. 2 shows a matrix-like table with the old state of the two incremental indicators when storing and the new state of the incremental indicators after the evaluation electronics are switched on again. In the first row labeled 21, the old states of the two incremental indicators when storing are input with 00, 01, 10, and 11. A possible new state of the incremental indicator after the system is switched on again is shown in the left column labeled 22. The values 0, 1, and 2 are entered at the intersecting points of the four rows and the four columns. The value 0 means that no change in the state from new to old has been recorded. The value 1 means that a correction of the position and the rotation direction is definitely possible. The value 2 means that a correction is not definitely possible.

In the event that after a renewed switching on of the system, both incremental indicators indicate a state change, i.e. after the evaluation electronics are reconnected to the supply voltage, when the stored values of the position indicators jointly indicate a state change, the evaluation electronics take the prior rotation direction into account in a correction in step 38 of FIG. 4. This is not always definitely possible with mechanical stops since, for example a rotation direction reversal can possibly occur when the stress in a mechanical system is relieved. In such cases, the value 2 can be used to check the tracking detection and the system can be reset if need be. Inaccuracies can also be taken into account, which arise due to the hysteresis of Hall sensors.

A micro-controller is advantageously included in the evaluation electronics. An electronically programmable memory can be used as the nonvolatile memory, in particular one that is an EEPROM, which can in a particularly suitable manner, be a component of the micro-controller.

The invention is preferably used in motor vehicles for detecting the position when an electric motor, which is used for positioning purposes, is switched off.

By means of the invention, the time for the after-running consideration or after-running detection of a motor when it is disconnected from the supply voltage is advantageously shortened, the buffer capacity can be reduced, inaccuracies caused by the hysteresis effects of the incremental position indicators used can be detected and there is the possibility of verifying the after-running detection within certain limits.

What is claimed is:

1. A method of detecting after-running of electrical servomotors with incremental position detection by means of incremental position indicators, said method comprising the steps of:

a) detecting position signals from the incremental position indicators by means of evaluation electronics;

b) providing a supply voltage to the evaluation electronics in order to operate the evaluation electronics;

c) storing states of the incremental position indicating devices, which are detected in conjunction with the position signals, in a non-volatile memory;

d) intermittently disconnecting the evaluation electronics from the supply voltage; and e) after switching off the evaluation electronics and subsequently switching the evaluation electronics on again, correcting the states of the incremental position indicators determined after the evaluation electronics are switched on again according to a comparison of the stored states of the incremental position indicators with the states of the incremental position indicators after the evaluation electronics are switched on again.

2. The method as defined in claim 1, wherein the storing of the states of the incremental position indicators takes place prior to a time at which a last possible position signal, which has not yet been detected, is detected by means of the evaluation electronics.

3. The method as defined in claim 1, wherein the comparison for the correction of the states of the incremental position detectors is carried out based on a matrix-like table and further comprising determining whether or not the correction is necessary, is definitely possible or is not definitely possible by means of said matrix-like table.

4. The method as defined in claim 3, further comprising allocating a rotation direction and correcting said states detected by said position indicators after the evaluation electronics are switched on again by using at least two of said position signals offset from each other when only one of said states changes when the evaluation electronics are switched on again.

5. The method as defined in claim 1, further comprising providing the evaluation electronics with a buffer large enough for the detecting of the position signals and the storing after disconnection of the evaluation electronics from the supply voltage.

6. The method as defined in claim 5, further comprising taking a prior rotation direction into account when performing said correcting after said evaluation electronics are switched on when said stored states jointly indicate a state change.

7. The method as defined in claim 1, further comprising positioning a motor vehicle part in a motor vehicle by means of the electrical servomotors.

8. The method as defined in claim 1, wherein said position indicators comprise two Hall sensors electrically offset by 90°.

9. The method as defined in claim 1, wherein the evaluation electronics includes a microcontroller.

10. The method as defined in claim 9, wherein the nonvolatile memory is an electronically programmable memory.

11. The method as defined in claim 10, wherein the electronically programmable memory is an EEPROM located in the microcontroller.

* * * * *